April 12, 1932.  H. G. WAINSCOTT  1,853,948
SANDING APPLIANCE FOR USE ON MOTOR VEHICLES
Filed Oct. 3, 1931  4 Sheets-Sheet 1

INVENTOR
H. G. Wainscott,

April 12, 1932. H. G. WAINSCOTT 1,853,948
SANDING APPLIANCE FOR USE ON MOTOR VEHICLES
Filed Oct. 3, 1931 4 Sheets-Sheet 2

INVENTOR
H. G. Wainscott

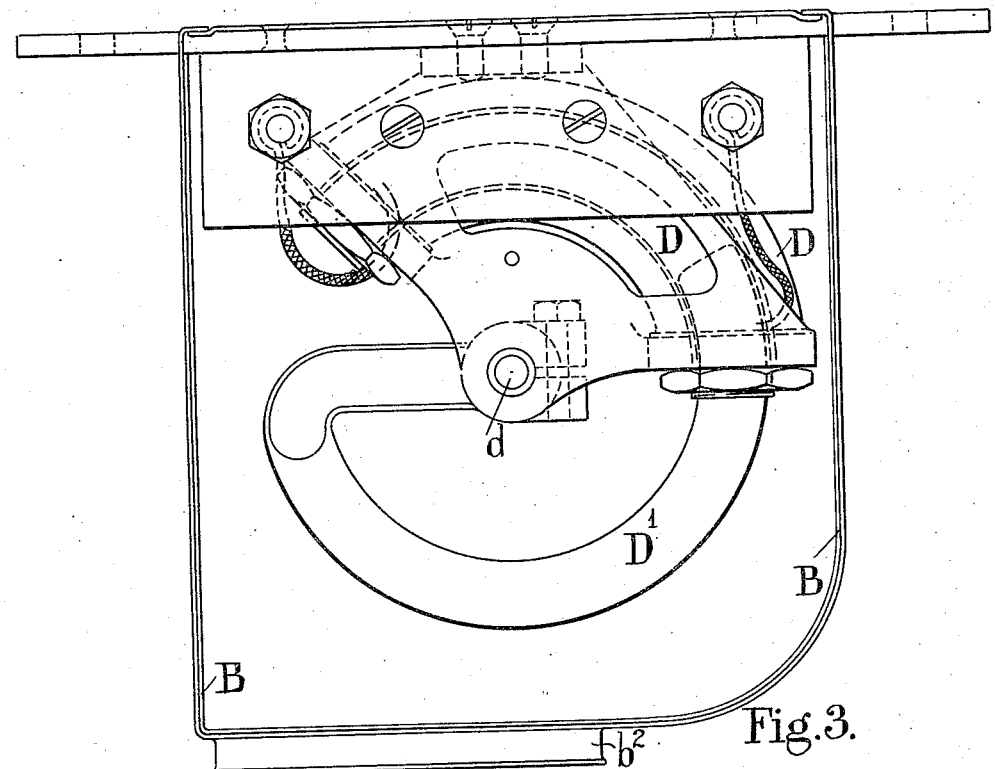
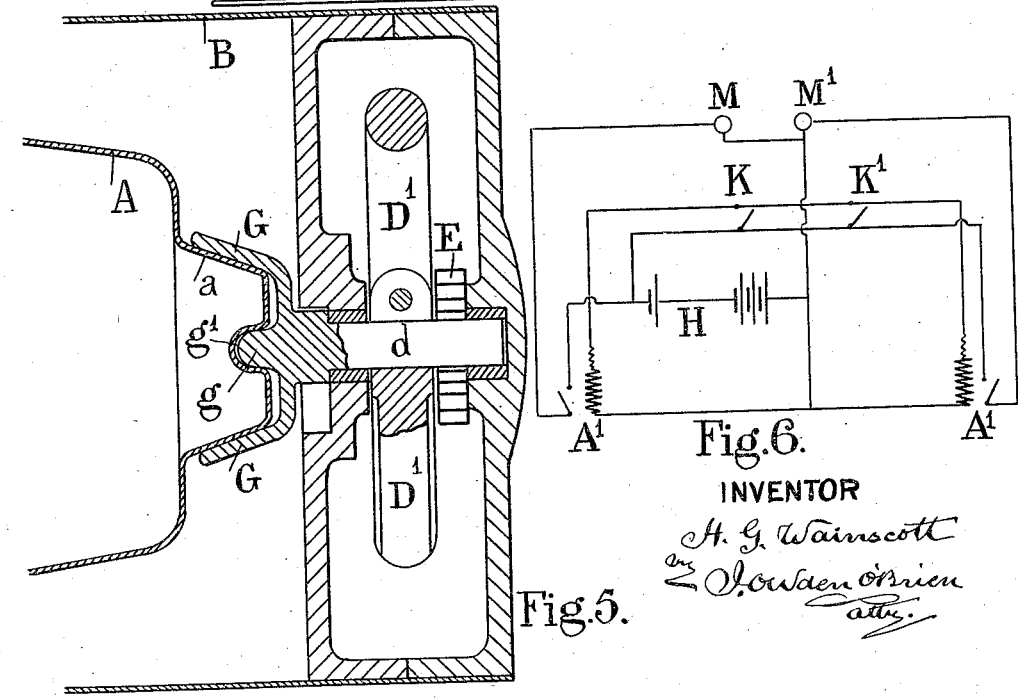

April 12, 1932.　　　H. G. WAINSCOTT　　　1,853,948
SANDING APPLIANCE FOR USE ON MOTOR VEHICLES
Filed Oct. 3, 1931　　　4 Sheets-Sheet 4

INVENTOR
H. G. Wainscott

Patented Apr. 12, 1932

1,853,948

UNITED STATES PATENT OFFICE

HENRY GEORGE WAINSCOTT, OF EDENFIELD, ENGLAND

SANDING APPLIANCE FOR USE ON MOTOR VEHICLES

Application filed October 3, 1931, Serial No. 566,735, and in Great Britain October 1, 1930.

The invention relates to apparatus for applying sand to the road in front of the wheels of road motor vehicles to prevent skidding on greasy or slippery roads.

It comprises a rotary sand container mounted on trunnions in an enclosed casing with a curved electric solenoid fitted at one end by which it may be rocked or rotated through an angle of nearly 180° against the action of a spring by which it is returned to normal or zero position.

It will be fully described with reference to the accompanying drawings:—

Figure 1:
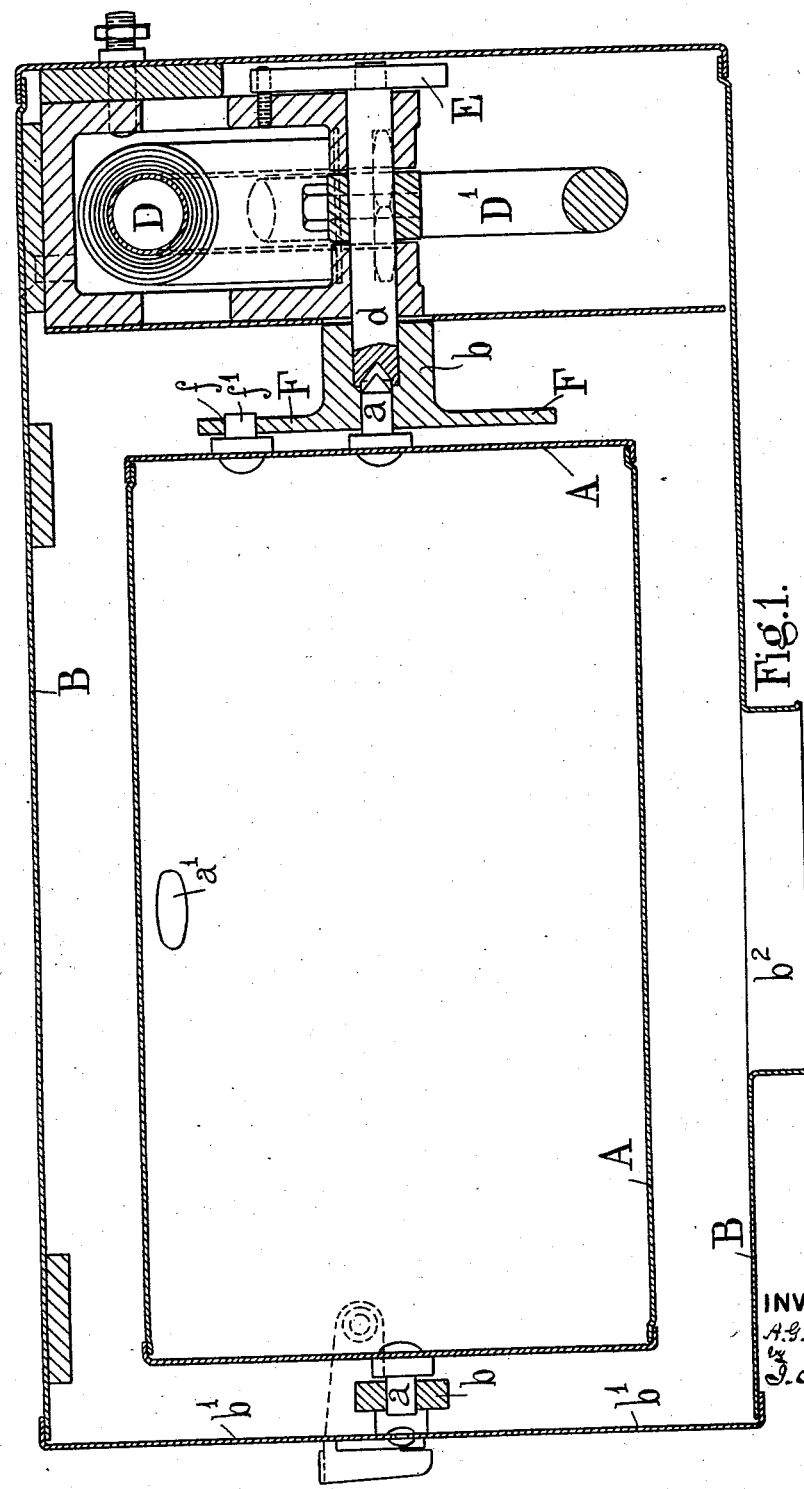
Figure 2:
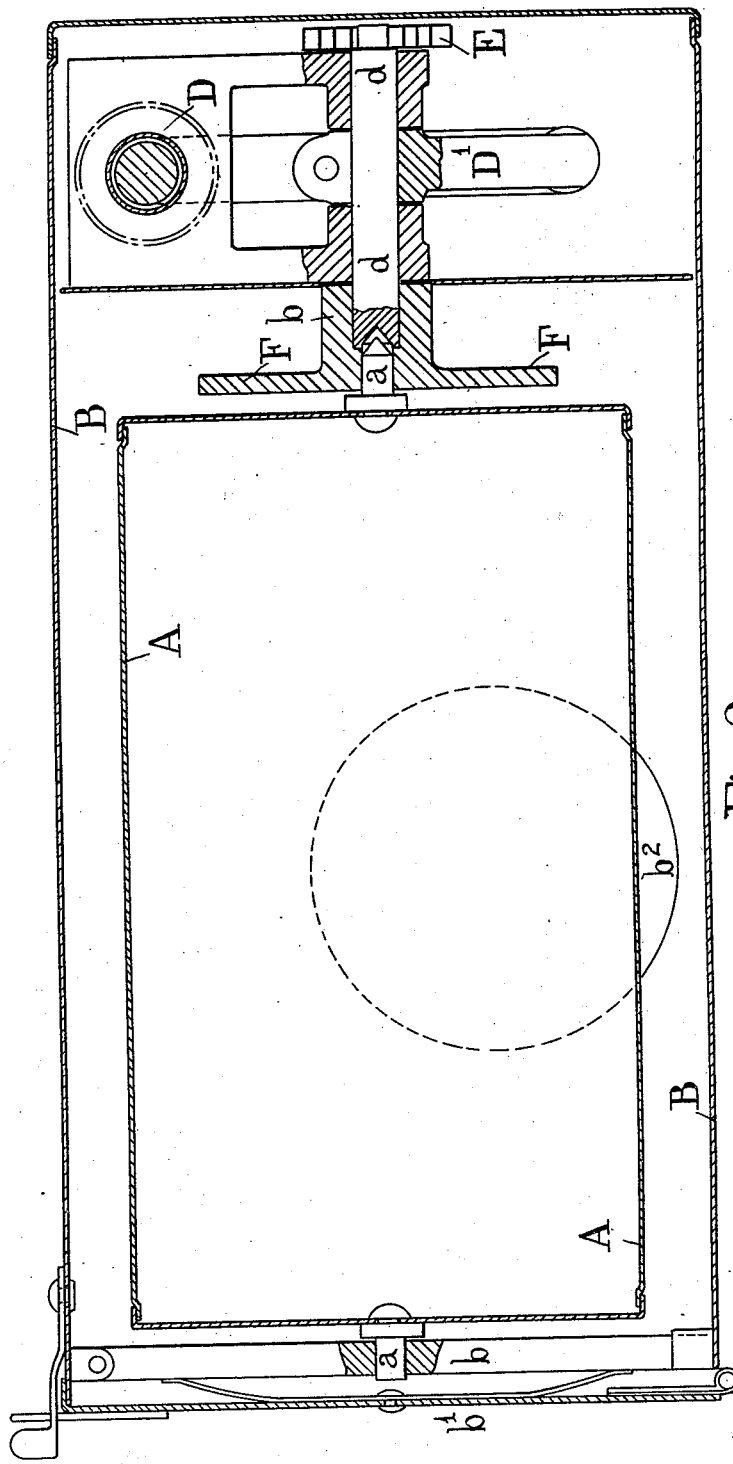
Figure 4:
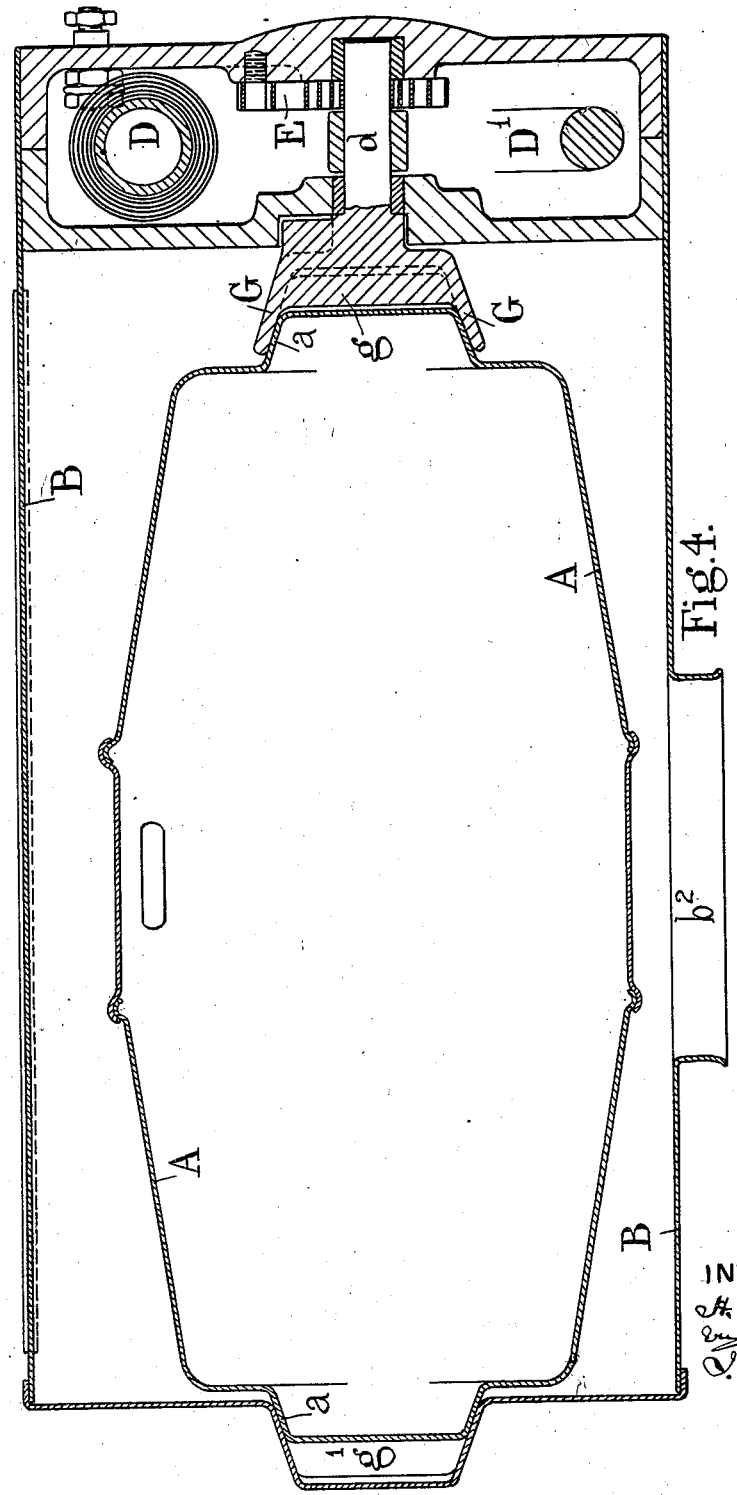

Fig. 1 is a longitudinal sectional elevation.
Fig. 2 is a sectional plan.
Fig. 3 is an end elevation showing the curved electric solenoid.
Fig. 4 is a longitudinal section showing a modified connection between the sand container and the solenoid.
Fig. 5 is a sectional plan of part of Fig. 4.
Fig. 6 is a wiring diagram of the electric connections.

The sand container A is preferably cylindrical and is provided with trunnions $a$ at both ends on which it can be rotated through part of a revolution. The sand container A is enclosed in a box or casing B fitted with bearings $b$ in which the trunnions $a$ are journalled. The box or casing B is provided with a lid or cover $b^1$ at one end and the container A is capable of being removed from the casing A to permit of it being filled with sand. One or more apertures $a^1$ are formed in the container for the insertion and discharge of sand.

The aperture $a^1$ is normally at the top of the container but when it is rotated part of a revolution say about 120° to 180° the aperture is brought to a position to discharge the sand from the container through an aperture or chute $b^2$ in the bottom of the casing B through which the sand is discharged onto the road directly in front of the wheel of the vehicle.

The sand container A is rocked or rotated on its trunnions by a curved electric solenoid D through an angle of about 120° to bring the aperture $a^1$ to a position to discharge the sand and is returned to normal position by a spring E.

The curved solenoid D is fitted into a compartment in the end of the casing B. The curved core $D^1$ of the solenoid is affixed to a centrally placed spindle or shaft $d$ which rotates as the core $D^1$ moves to and fro in the coil of the solenoid.

In the construction shown in Figs. 1 and 2 the rotary spindle $d$ of the solenoid is fitted with a disc F at the free end with a central bearing to receive the trunnion $a$ of the container A and a hole $f$ eccentrically placed to engage a pin $f^1$ projecting from the end of the container A through which the motion of the solenoid core $D^1$ is imparted thereto.

In the construction shown in Figs. 4 and 5 the rotary spindle $d$ of the solenoid is fitted with a cup shaped disc G at its free end to receive the trunnion $a$ of the container A and a transverse key or feather $g$ therein engages a slot $g^1$ in the end of the trunnion through which the motion of the solenoid core $D^1$ is imparted to the sand container A.

The spring E by which the solenoid core $D^1$ and the container A is returned to normal position is a coiled spring attached to the end of the spindle $d$.

The solenoid D is connected to the battery H by a switch which may be operated by hand or by foot of the driver of the vehicle or the switch may be operated by the brake lever to discharge sand as the brake is applied.

The wiring diagram in Fig. 6 shows the disposition of a battery H, a sand container $A^1$ at the right hand side, a sand container at the left hand side, a foot switch K, a hand switch $K^1$ and signal lights M $M^1$ to indicate that the respective solenoids have been operated.

When the solenoid D is energized the core $D^1$ is attracted into its coil or winding against the action of the spring E and a rotary movement imparted to the spindle $d$ the spring returning the core $D^1$ when the solenoid is de-energized.

The enclosed sand container A and solenoid D may be affixed in any convenient position to the chassis or body of the vehicle to deliver the sand in front of the driving wheels.

Although the container A is preferably of cylindrical shape it may be of rectangular or other angular cross-sections, and it may be constructed of metal, wood, or composition and of dimensions and shape to suit specific requirements.

What I claim as my invention and desire to protect by Letters Patent is:—

1. Apparatus for discharging and delivering sand to the wheel track of a motor vehicle comprising a rotary sand container mounted on trunnions and provided with filling and discharge apertures in combination with a curved electric solenoid connected to it at one end adapted to rotate it part of a revolution in one direction and a spring to return it to normal position.

2. Apparatus for discharging and delivering sand to the wheel track of a motor vehicle comprising in its construction a rotary sand container mounted on trunnions and provided with filling and discharge aperture, a casing within which the sand container is enclosed, a curved electric solenoid disposed within the casing at one end, a curved core within the solenoid coil fitted with a central rotary spindle adapted to rotate part of a revolution in either direction and means to connect the core spindle with the sand container to impart motion thereto.

3. Apparatus for discharging and delivering sand to the wheel track of a motor vehicle comprising in its construction a rotary sand container mounted on trunnions and provided with filling and discharge apertures, a casing within which the sand container is enclosed provided with an aperture through which the sand is discharged, a curved electric solenoid disposed at one end of the sand container, a curved core within the solenoid coil, a central rotary spindle attached to the core to rotate as the core moves to and fro in the coil, a disc on the core spindle with which the end of the sand container engages to receive motion therefrom.

In testimony whereof I have hereunto set my hand.

HENRY GEORGE WAINSCOTT.